(12) United States Patent
Huang et al.

(10) Patent No.: US 11,089,547 B2
(45) Date of Patent: Aug. 10, 2021

(54) APPARATUS, SYSTEM, AND METHOD TO TEAR DOWN A NEGOTIATED WAKE-UP RADIO MODE

(71) Applicant: Intel Corporation, Santa Clara, CA (US)

(72) Inventors: Po-Kai Huang, San Jose, CA (US); Robert J. Stacey, Portland, OR (US); Daniel F. Bravo, Portland, OR (US); Noam Ginsburg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/144,983

(22) Filed: Sep. 27, 2018

(65) Prior Publication Data

US 2019/0045445 A1   Feb. 7, 2019

Related U.S. Application Data

(60) Provisional application No. 62/578,999, filed on Oct. 30, 2017.

(51) Int. Cl.
| | |
|---|---|
| *H04W 72/04* | (2009.01) |
| *H04W 52/02* | (2009.01) |
| *H04L 1/16* | (2006.01) |
| *H04L 29/06* | (2006.01) |
| *H04W 84/12* | (2009.01) |
| *H04L 1/00* | (2006.01) |

(52) U.S. Cl.
CPC ....... *H04W 52/0229* (2013.01); *H04L 1/1607* (2013.01); *H04L 69/22* (2013.01); *H04W 72/0446* (2013.01); *H04L 1/0061* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 2009/0217157 A1* | 8/2009 | Gegout | H04N 21/44012 715/255 |
| 2018/0069683 A1* | 3/2018 | Huang | H04W 52/0222 |
| 2019/0045451 A1* | 2/2019 | Huang | H04L 5/0053 |
| 2019/0246356 A1* | 8/2019 | Kim | H04W 52/0235 |
| 2019/0327672 A1* | 10/2019 | Hwang | H04L 5/0053 |

* cited by examiner

*Primary Examiner* — Noel R Beharry
*Assistant Examiner* — Pamit Kaur
(74) *Attorney, Agent, or Firm* — Alliance IP, LLC

(57) ABSTRACT

A device, a system, and a method. The device is configured to be part of a first wireless apparatus, and comprises a memory, and processing circuitry coupled to the memory and including logic to cause the first wireless apparatus to: perform a WUR Mode setup frame exchange with a Primary Connectivity Radio (PCR) of a second wireless apparatus; establish a Wake-Up Radio (WUR) Mode operation with the second wireless apparatus based on the frame exchange; transmit a Wake-Up Radio (WUR) Teardown Frame to the PCR of the second wireless apparatus, the WUR Mode Teardown frame including information to cause a teardown of the WUR Mode operation with the second wireless apparatus; and process an acknowledgment message (ACK) from the second wireless apparatus to tear down the WUR Mode operation with the second wireless apparatus.

23 Claims, 8 Drawing Sheets

APPARATUS, SYSTEM, AND METHOD TO TEAR DOWN A NEGOTIATED WAKE-UP RADIO MODE

CROSS-REFERENCE TO RELATED APPLICATION

This application claims the benefit of and priority from U.S. Provisional Patent Application No. 62/578,999 entitled "Wake Up Receiver Mode Teardown," filed Oct. 30, 2017, the entire disclosure of which is incorporated herein by reference.

TECHNICAL FIELD

Embodiments described herein generally relate to apparatuses, systems and method for wireless communications and, more particularly, to mechanisms for achieving teardown of a wake-up receiver (WUR) Mode operation.

BACKGROUND

Wake-Up (WU) receiver (WUR) operation according to the Institute of Electrical and Electronics Engineers (IEEE) 's 802.11ba amendments may be established between two wireless apparatuses using WUR setup negotiations. Procedures are needed to allow the WUR operation to be torn down from time to time.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
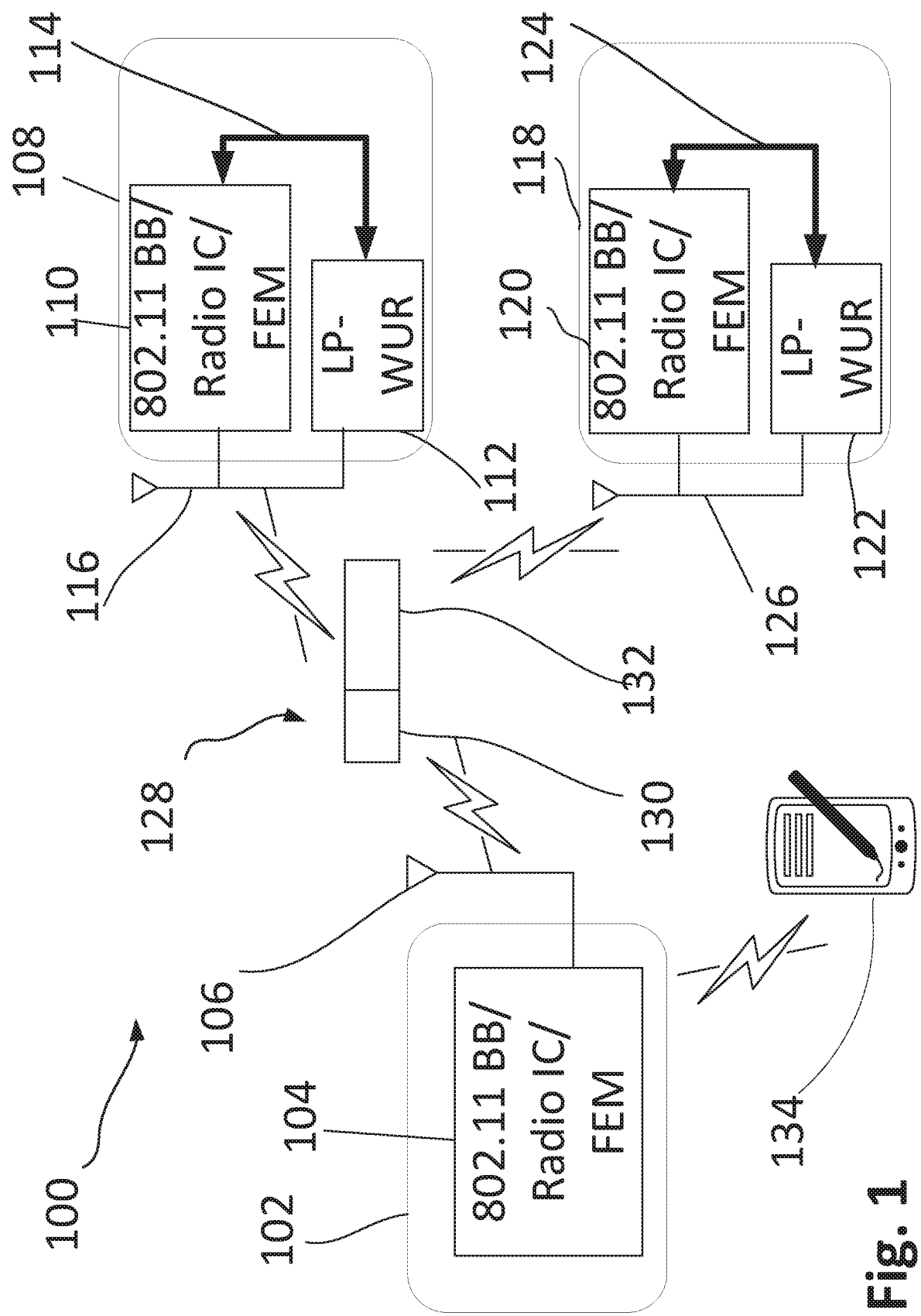
FIG. 1 illustrates a basic service set (BSS) including an access point (AP), two stations (STAs) each including Low-Power Wake-Up Receivers/Radios (WURx's), and a legacy STA.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units, and/or circuits have not been described in detail so as not to obscure the discussion.

Discussions herein utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems—for example, user equipment (UE), a mobile device (MD), a wireless station (STA), a personal computer (PC), a desktop computer, a mobile computer, a laptop computer, a notebook computer, a tablet computer, a server computer, a handheld computer, a handheld device, an Internet of Things (IoT) device, a sensor device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) 802.11 standards or protocols, including IEEE 802.11-2012, ("IEEE Standard for Information technology—Telecommunications and information exchange between systems Local and metropolitan area networks—Specific requirements Part 11: Wireless LAN Medium Access Control (MAC) and Physical Layer (PHY) Specifications," Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11:

Wireless LAN Medium Access Control (MAC) and Physical Layer (PHY) Specifications—Amendment 4: Enhancements for Very High Throughput for Operation in Bands below 6 GHz," December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," 28 Dec. 2012); IEEE-802.11REVmc ("IEEE 802.11-REVmcTM/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning), and/or future versions and/or derivatives thereof, devices and/or networks operating in accordance with existing Wi-Fi Alliance (WFA) specifications (including WLAN Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WLAN P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc. WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long-Term Evolution (LTE) and/or future versions and/or derivatives thereof, units and/or devices which are part of the above networks, and the like.

Some embodiments may be used to communicate in one-way and/or two-way radio communication systems, cellular radio-telephone communication systems, a mobile phone, a cellular telephone, a wireless telephone, a Personal Communication Systems (PCS) device, a PDA device that incorporates a wireless communication device, a mobile or portable global positioning system (GPS) device, a device that incorporates a GPS receiver or transceiver or chip, a device that incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device—for example, a smartphone—a Wireless Application Protocol (WAP) device, or the like.

Some embodiments may be used to communicate one or more types of wireless communication signals or protocols, for example, radio frequency (RF), infrared (IR), frequency-division multiplexing (FDM), orthogonal FDM (OFDM), orthogonal frequency-division multiple access (OFDMA), FDM time-division multiplexing (TDM), time-division multiple access (TDMA), multi-user MIMO (MU-MIMO), spatial division multiple access (SDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), WLAN, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long-Term Evolution (LTE), LTE advanced, Enhanced Data rates for GSM Evolution (EDGE), or the like. Other embodiments may be used in various other devices, systems, and/or networks.

The term "wireless communication device," as used herein, includes, for example, a portable or non-portable device capable of wireless communication. In some demonstrative embodiments, a wireless communication device may be or may include a peripheral device that is to be integrated with a computer, or a peripheral that is to be attached to a computer. The term "wireless communication device," as used herein, may include, for example, a smallest chip or integrated circuit that may provide a given described functionality.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a receiver to receive the communication signal from at least one other communication unit such as an AP or a STA. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used to communicate in a WLAN—for example, a WLAN network. Other embodiments may be used in conjunction with any other suitable wireless communication network—for example, a wireless area network, a "piconet," a WPAN, a WVAN, and the like.

Some demonstrative embodiments may be used to communicate over a frequency band of 2.4 GHz or 5 GHz, and/or a frequency band, such as for Wi-Fi and for Wake-Up Receiver (WUR) communications. However, other embodiments may be implemented utilizing any other suitable wireless communication frequency bands—for example, a sub 1 GHz (S1G) frequency band, an Extremely High Frequency (EHF) band (the millimeter wave (mmWave) frequency band, such as a frequency band within the frequency band of between 20 Ghz and 300 GHZ, such as the 60 Ghz frequency band), WLAN frequency bands, WPAN frequency bands, and the like.

As used herein, the term "circuitry" may refer to, be part of, or include, an Application Specific Integrated Circuit (ASIC), an integrated circuit, an electronic circuit, a processor (shared, dedicated, or group) circuitry, and/or memory circuitry (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware (e.g., silicon blocks of various chips and/or processors). Logic may be included in, and/or implemented as part of, various circuitry (e.g. radio circuitry, receiver circuitry, control circuitry, transmitter circuitry, transceiver circuitry, processor circuitry, or the like). In one example, logic may be embedded in volatile memory and/or non-volatile memory, including random access memory, read-only memory, programmable memory, magnetic memory, flash memory, persistent memory, and the like. Logic may be executed by one or more processors using memory (e.g., registers, buffers, stacks, and the like) coupled to the one or more processors, e.g., as necessary to execute the logic. The term "antenna," as used herein, may include any suitable configuration, structure, and/or arrangement of one or more antenna elements, components, units, assemblies, and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, or the like.

To reduce power consumption in a basic service set (BSS), the idea of using a low-power wake-up receiver (LP-WUR or WURx) in Wi-Fi devices has been developed, and has been introduced into the Institute of Electrical and Electronics Engineers (IEEE) 802.11 community in late 2015. Since that time, the concept of using a WURx has received much attention. A Study Group (SG) named Wake-Up Receiver (WUR) SG was formed under IEEE 802.11 to study and begin standardization of the new wireless communication protocol as a new amendment to the 802.11 standard specification. The WUR SG was approved and replaced by the 802.11TGba Task Group. The WURx provides an ultra-low power solution (for example about 100 µW in an active state) for an always on Wi-Fi or Bluetooth (BT) connectivity of wearable, Internet-of-Things (IoT) or other emerging devices that may be densely deployed. Although 100 µW is mentioned here, it is merely an example of the power used in a listen state. Embodiments encompass WURs that use lower or high power, such as, for example, a few hundred µW. Hereinafter, WUR may be used to refer to the 802.11ba/WUR wireless communication protocol, or to WU functionality (that is, functionality in compliance with the WUR wireless communication protocol), and the meaning of the acronym will be clear from the context within which it is used.

To better understand the concept behind WUR, we refer to FIG. 1, which depicts a Wireless Local Area Network (WLAN) BSS 100 including an AP 102, two WUR compliant non-AP STAs (or WUR non-AP STAs) 108 and 118, and a legacy STA 134. By "legacy," what is meant herein is compliance with a standard that is not WUR. The AP and STAs may, regardless of compliance with WUR, use one of the IEEE 802.11 wireless communication protocols to transmit and receive. The AP and STAs may use other communications protocols as well as any of the IEEE 802.11 protocols. The IEEE 802.11 protocols may include Wi-Fi protocols, for example, the IEEE 802.11ax protocol, the 802.11ac protocol, the 802.11-2012 protocol, the 802.11n protocol, the 802.11a protocol, the 802.11g protocol, and/or any other 802.11 protocol. The IEEE 802.11 protocols may include using orthogonal frequency division multiple-access (OFDMA), time division multiple access (TDMA), and/or code division multiple access (CDMA). The IEEE 802.11 protocol may include space-division multiple access (SDMA) and/or multiple-user multiple-input multiple-output (MU-MIMO).

The AP and each of STA 108 and 118 is shown to that effect as including an 802.11 radio system such as 802.11 radio system 104 of AP 102, 802.11 radio system 110 of STA 108 and 802.11 radio system 120 of STA 118 (the radio system for legacy STA 134 has not been shown, although a person skilled in the art would readily understand that it would be present). Each radio system may include one or more baseband processors, one or more radio integrated circuits, and one or more radio front-end modules as would be recognized by one skilled in the art. In addition, each radio system may be coupled to one or more antennas. For example, radio system 104 may be coupled to antenna 106 to allow transmission and reception of radio signals by AP 102. Radio system 110 may be coupled to antenna 116 to allow transmission and reception of radio signals by STA 108 and radio system 110 may be coupled to antenna 126 to allow transmission and reception of radio signals by STA 108. Although each radio system is shown in FIG. 1 as being coupled to one antenna, it is to be understood that embodiments apply to APs or STAs that include one or more antennas coupled to the same radio system, and one or more antennas coupled to various radio systems that are compliant with protocols other than 802.11. Embodiments include within their scope the provision of various components of a radio system on a single physical integrated circuit (or card), or on multiple integrated circuits as would be recognizable by one skilled in the art.

Referring still to FIG. 1, STAs 108 and 118 each include a WURx that is coupled to their 802.11 radio systems 110. It is to be noted that, although FIG. 1 suggests the WURx as potentially being physically distinct from the 802.11 radio system in each STA, embodiments include within their scope various levels of integration between the WURx and the 802.11 radio system. For example, the WURx could include at least one of a WUR baseband processor, a WUR integrated circuit (IC), and a WUR front-end module (FEM) that is integrated with a respective one of the non-WUR 802.11 baseband processor, radio IC and FEM.

With respect to AP 102, FIG. 1 does not show a WURx that is coupled to the 802.11 radio system. This is not to suggest that AP may not include a WURx, but merely that, with respect to the operations to be described further below with respect to BSS 100 of FIG. 1, the presence of a WURx as part of AP 102 may not be relevant, because WU packets would in general not be sent to AP 102 (as its main radio would be on/awake) during those operations to be described, but would rather be sent by AP 102. The above having been said, the 802.11 radio system of AP 102, in the shown embodiment, would have WUR transmission functionality in that it would be configured to send WUR packets to other WUR compliant STAs.

Referring still to FIG. 1, AP 102 is shown as having sent a WU packet 128 addressed to STA 108. The WU packet 128 includes a preamble portion 130, and a wake-up portion 132. A purpose of WU packet 128 could be to alert a WURx to wake up its main radio system, such as, for example, an 802.11ax, 802.11ac, 802.11-2012, 802.11n or other radio system that operates at a higher power level and processes higher modulation rate symbols than that applicable to the WURx and that can receive and process user data packets. The main radio system according to some embodiments may include a Primary Connectivity Radio (PCR). The PCR may include a radio with the capability to transmit and receive 20 MHz non-Hight Throughput (non-HT) PPDU. The portion of the AP that provides WUR transmission functionality may be embedded with the PCR, or it may be distinct from the PCR.

For example, packet 128 as sent by AP 102 may be addressed to WURx 112 of STA 108 or to WURx 122 of STA 118 (or potentially both) to signal to either or both WURx's to wake up its/their associated PCRs so that the PCRs can subsequently receive user data packets sent by AP 102, and specifically sent by PCR 104 of AP 102. The PCRs of the non-AP STAs are in this way capable of remaining in the off or low-power state to conserve power because the companion WURx's are to remain in an on state to receive any WUR packets to wake up non-AP STA PCRs if needed. A signaling between each WURx and its associated PCR is depicted in FIG. 1 by way of a signal connection 114 and 124 corresponding respectively to a connection between WURx 112 and PCR 110 on the one hand, and between WURx 122 and PCR 120 on the other hand. The connection may for example be wired or wireless, and is to allow a wake-up signal to be sent from the WURx to its PCR to wake up the main radio system for reception of data packets.

It is to be appreciated that a WURx may be configured as a simple receiver without including a transmitter, and further without the capability of processing user OFDM modulated data packets per se. It may remain on/active as long as the PCR is off or in a doze state, and may be inactive when the PCR is on/active. However, the WURx may also remain on/active when the PCR is on/active based on application needs. WU packets may be generated by an AP using a simple modulation scheme such as an On-Off-Keying (OOK) modulation scheme, and a narrow bandwidth such as, for example, a bandwidth of less than about 5 MHz, for example, about 4.06 MHz or about 2.031 MHz. A target transmission range of a WU packet may be similar to a transmission range for today's 802.11 compliant transmitters, that is, up to a few hundred meters, such as, for example, up to about 250 m to 300 m, or more.

A concept for WUR is based on the 802.11a/g/n/ac specification which uses a 4 μsec (3.2 μsec+Cyclic Prefix (CP)) Orthogonal Frequency Division Multiplexing (OFDM) duration. In a time-domain, the above would provide a symbol duration of 3.2 μsec (taking the Inverse Fast Fourier Transform (IFFT) as 64/20 MHze6). Taking into consideration the legacy preambles using a fixed 0.8 μsec guard band or cyclic prefix extension, the total symbol duration becomes 4 μsec. A WU signal, such as a WU portion of a WU packet, may have a pulse bandwidth of 2.03 MHz or 4.06 MHz; a frequency spacing between tones in the wake-up portion of 78.125 kHz or 312.5 kHz; and the wake-up portion may include 26 tones or 13 tones per symbol, with any combination of the above pulse bandwidths, frequency spacing between tones and number of tones per symbol being possible.

WUR further contemplates using 13 subcarriers (4.06 MHz) per symbol. For example, a WU signal waveform may have 1 bit per symbol period, with each symbol period being about 4 μsec, achieving a rate of about 250 kbps.

In some demonstrative embodiments, the wireless medium may include, for example, a radio channel, an RF channel, a Wireless Fidelity (WLAN) channel, a cellular channel, an IR channel, a WUR channel, and the like. One or more elements of BSS 100 may optionally be capable of communicating over any suitable wired communication links.

In some demonstrative embodiments, a STA within a wireless network may include, for example, user equipment (UE), a mobile device (MD), a WLAN STA, a mobile computer, a laptop computer, an Internet of Things (IoT) device, a sensor device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device that incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a smartphone, or the like.

In some demonstrative embodiments, one or more of the plurality of STAs may include, may perform a role of, and/or may perform the functionality of, an access point (AP) station (STA), or of a non-AP STA.

It is to be appreciated that the signaling described herein to bring about a WUR Mode teardown, although described herein in the context of communications between an AP and a non-AP STA, is not so limited, and may include, according to some embodiments, peer to peer signaling between two non-AP STAs to effect the WUR Mode teardown.

In one example, STA may include a logical entity that is a singly addressable instance of a medium access control (MAC) and physical layer (PHY) interface to the wireless medium. The STA may perform any other additional or alternative functionality.

In one example, an AP may include an entity that contains a STA, and provides access to distribution services, via the wireless medium for associated STAs. The AP may perform any other additional or alternative functionality, and may be wired to a router, or may be an integral part of a router, to provide connection to a network.

In one example, a non-AP STA may include a STA that is not contained within an AP. The non-AP STA may perform any other additional or alternative functionality.

Figure 2:
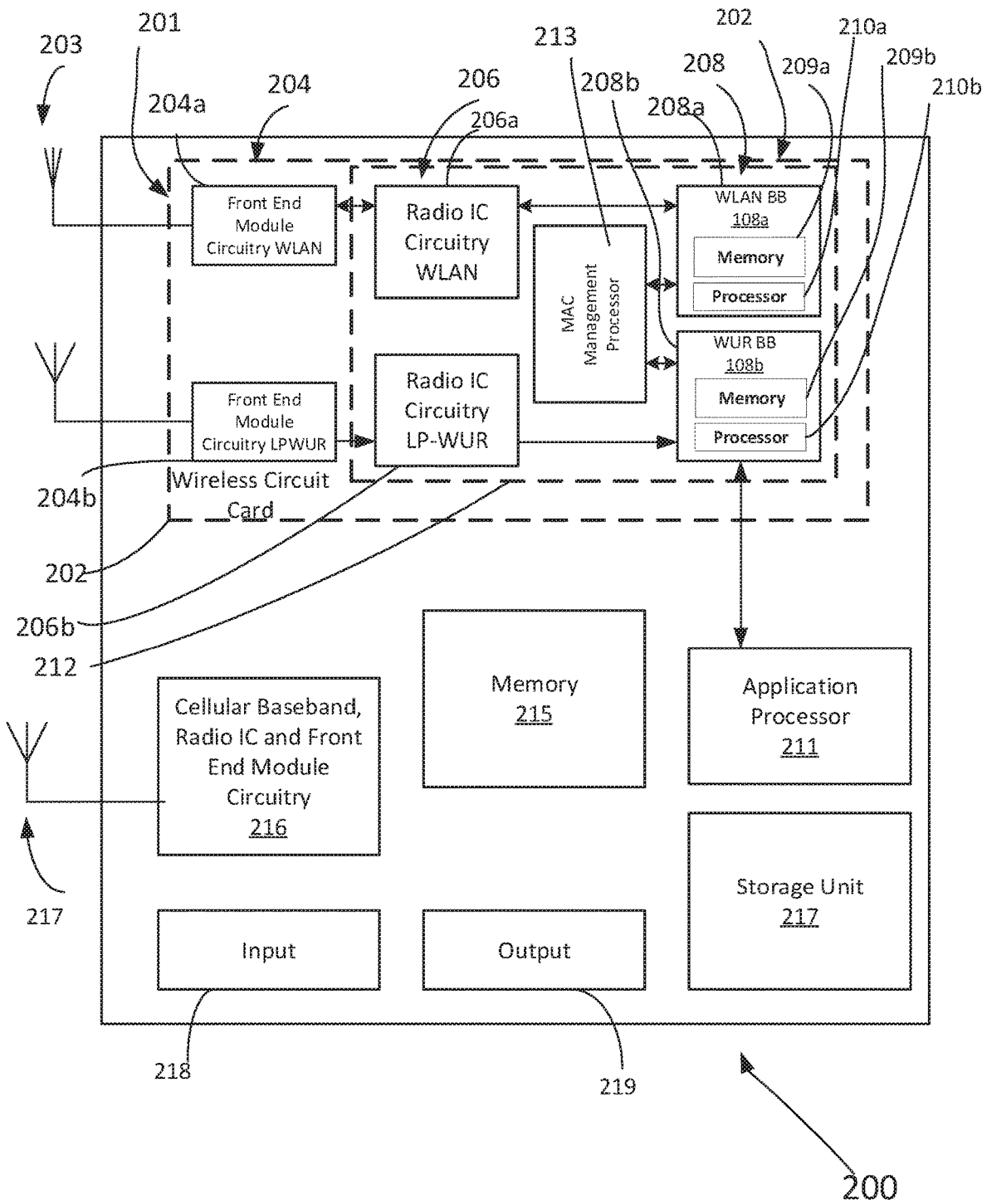
FIG. 2 is a schematic illustration of a radio architecture of a STA or an AP from the BSS of FIG. 1 in accordance with some demonstrative embodiments.

When referring to FIG. 2, it is noted that the figure depicts one embodiment of a STA, or one embodiment of an AP, as would be recognized by a skilled person, although embodiments are not so limited. At certain points within the below description, therefore, FIG. 2 will be referred to as an apparatus including an architecture for a STA 200, while at certain other points within the below description, FIG. 2 will be referred to as an apparatus including an architecture for an AP 200. The context will, however, be clear based on the description being provided.

Referring next to FIG. 2, a block diagram is shown of a wireless communication STA 200 or AP 200, such as any of STA1 through STA6, or AP1 through AP3, according to some demonstrative embodiments. The shown wireless communication station includes a wireless communication radio architecture 201 in accordance with some embodiments. Radio architecture 201 may include radio front-end module (FEM) circuitry 204, radio integrated circuit (IC)

circuitry 206, and baseband processing circuitry 208. Radio architecture 201 as shown includes both Wireless Local Area Network (WLAN) functionality and WUR functionality, although embodiments are not so limited. In this disclosure, "WLAN" and "Wi-Fi" are used interchangeably. WUR refers to medium access control layer (MAC) and physical layer (PHY) specifications in accordance with efforts within the Institute of Electrical and Electronics Engineers (IEEE) regarding a WUR standard or IEEE 802.11ba.

FEM circuitry 204 may include a WLAN or Wi-Fi FEM circuitry 204a and a WUR FEM circuitry 204b. The WLAN FEM circuitry 204a may include a receive signal path comprising circuitry configured to operate on WLAN RF signals received from one or more antennas 203, to amplify the received signals and to provide the amplified versions of the received signals to the WLAN radio IC circuitry 206a for further processing. The WUR FEM circuitry 204b may include a receive signal path that may include circuitry configured to operate on WU RF signals received from one or more antennas 203, to amplify the received signals and to provide the amplified versions of the received signals to the WU radio IC circuitry 206b for further processing. FEM circuitry 204a may also include a transmit signal path that may include circuitry configured to amplify WLAN signals provided by the radio IC circuitry 206a for wireless transmission by one or more of the antennas 203. The WUR signal path as shown does not include a transmit signal path, however, but embodiments include within their scope the possibility of the WUR signal path to possibly include a transmit signal path. In the embodiment of FIG. 2, although WLAN or Wi-Fi FEM circuitry 204a and WUR FEM circuitry 204b are shown as being distinct from one another, and connected to respective distinct antennas, embodiments are not so limited, and include within their scope the use of an FEM (not shown) that includes a transmit path and/or a receive path for WLAN and WUR signals, or the use of one or more FEM circuitries or one or more antennas where at least some of the FEM circuitries and antennas share transmit and/or receive signal paths for WLAN and WUR signals.

Where the radio architecture 201 is an AP, the WUR BB 208b may, according to one embodiment, be altogether omitted in favor of WUR functionality to generate WUR signals for transmission being a part of the WiFi BB circuitry 208a. Alternatively, where the radio architecture 201 is an AP, the WUR BB 208b may have only transmit functionality to transmit WUR packets to a STA.

Radio IC circuitry 206 as shown may include WLAN radio IC circuitry 206a and WU radio IC circuitry 206b. The WLAN radio IC circuitry 206a may include a receive signal path that may include circuitry to down-convert WLAN RF signals received from the FEM circuitry 204a and provide baseband signals to WLAN baseband processing circuitry 208a. WU radio IC circuitry 206b may in turn include a receive signal path that may include circuitry to down-convert WU RF signals received from the FEM circuitry 204b and provide baseband signals to WUR baseband processing circuitry 208b. WLAN radio IC circuitry 206a may also include a transmit signal path that may include circuitry to up-convert WLAN baseband signals provided by the WLAN baseband processing circuitry 208a and provide WLAN RF output signals to the FEM circuitry 204a for subsequent wireless transmission by the one or more antennas 203. In the embodiment of FIG. 2, although radio IC circuitries 206a and 206b are shown as being distinct from one another, embodiments are not so limited, and include within their scope the use of a radio IC circuitry (not shown) that includes a transmit signal path and/or a receive signal path for both WLAN and WUR signals, or the use of one or more radio IC circuitries where at least some of the radio IC circuitries share transmit and/or receive signal paths for both WLAN and WUR signals.

Baseband processing circuitry 208 may include a WLAN baseband processing circuitry 208a and a WUR 208b. The WLAN baseband processing circuitry 208a may include a memory 209a, such as, for example, a set of RAM arrays in a Fast Fourier Transform or Inverse Fast Fourier Transform block (not shown) of the WLAN baseband processing circuitry 208a. Each of the WLAN baseband processing circuitry 208a and the WUR baseband processing circuitry 208b may further include a memory 209b similar to memory 209a described above, and one or more respective processors 210a and 210b including control logic to process the signals received from the corresponding WLAN or WUR receive signal path of the radio IC circuitry 206. WLAN baseband processing circuitry 208a is configured to also generate corresponding WLAN baseband signals for the transmit signal path of the radio IC circuitry 206. Each of the baseband processing circuitries 208a and 208b may further include physical layer (PHY) and medium access control layer (MAC) circuitry, and may further interface with application processor 211 for generation and processing of the baseband signals and for controlling operations of the radio IC circuitry 206. According to some embodiments, the baseband processing circuitries 208a and 208b could be integrated into a single circuitry, with one baseband circuitry fulfilling both WLAN and WUR functionalities.

Referring still to FIG. 2, according to the shown embodiment, a MAC management processor 213 may include a processor having logic to provide a number of higher MAC functionalities, such as, for example, signaling the WURx to scan during for discovery of other WUR enabled devices that the WURx could connect to, enabling a triggering of the WLAN baseband processing circuitry 208a through signals from the WUR baseband processing circuitry 208b. In the alternative, or in conjunction with the MAC management processor 213, some of the higher-level MAC functionalities above may be provided by application processor 211. In addition, although the antennas 203 are depicted as being respectively connected to the WLAN FEM circuitry 204a and the WUR FEM circuitry 204b, embodiments include within their scope the sharing of one or more antennas as between the WLAN and WUR FEMs, or the provision of more than one antenna connected to each of FEM circuitry 204a or 204b.

In some embodiments, the front-end module circuitry 204, the radio IC circuitry 206, and baseband processing circuitry 208 may be provided on a single radio card, such as wireless radio card 202. In some other embodiments, the one or more antennas 203, the FEM circuitry 204, and the radio IC circuitry 206 may be provided on a single radio card. In some other embodiments, the radio IC circuitry 206 and the baseband processing circuitry 208 may be provided on a single chip or integrated circuit (IC), such as IC 212.

In some embodiments, the wireless radio card 202 may include a WLAN radio card and may be configured for Wi-Fi communications, although the scope of the embodiments is not limited in this respect. In some of these embodiments, the radio architecture 201 may be configured to receive and transmit orthogonal frequency division multiplexed (OFDM) or orthogonal frequency division multiple access (OFDMA) communication signals over a multi-carrier communication channel. The OFDM or OFDMA signals may comprise a plurality of orthogonal subcarriers.

In some of these multi-carrier embodiments, radio architecture 201 may be part of a Wi-Fi communication STA, a wireless AP, a base station, or a mobile device including a Wi-Fi device. In some of these embodiments, radio architecture 201 may be configured to transmit and receive signals in accordance with specific communication standards and/or protocols, such as any of the Institute of Electrical and Electronics Engineers (IEEE) standards, including 802.11n-2009, IEEE 802.11-2012, 802.11n-2009, 802.11ac, and/or 802.11ax standards and/or proposed specifications for WLANs, although the scope of embodiments is not limited in this respect. Radio architecture 201 may also be suitable to transmit and/or receive communications in accordance with other techniques and standards.

In some embodiments, the radio architecture 201 may be configured for high-efficiency Wi-Fi (HEW) communications in accordance with the IEEE 802.11ax standard. In these embodiments, the radio architecture 201 may be configured to communicate in accordance with an OFDMA technique, although the scope of the embodiments is not limited in this respect.

In some other embodiments, the radio architecture 201 may be configured to transmit and/or receive signals transmitted using one or more other modulation techniques, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some embodiments, the radio architecture 201 may include other radio cards, such as a cellular radio card 216 configured for cellular (e.g., 3GPP such as LTE, LTE-Advanced, or 5G communications).

In some IEEE 802.11 embodiments, the radio architecture 201 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some embodiments, a 320 MHz channel bandwidth may be used. The scope of the embodiments is not limited with respect to the above center frequencies, however.

Where the radio architecture 201 is an AP, the WUR BB 208b, the radio IC circuitry 206b and/or the FEM 204b may, according to one embodiment, be altogether omitted in favor of WUR functionality to generate WUR signals for transmission being a part of, respectively, the WiFi BB circuitry 208a, the radio IC circuitry 206a and/or the FEM 204a. Alternatively, where the radio architecture 201 is an AP, the WUR BB 208b, radio IC circuitry 206b and/or FEM 204b may have only transmit functionality to transmit WUR packets to a STA.

Referring still to FIG. 2, in some demonstrative embodiments, STA 200 may further include an input unit 218, an output unit 219, and a memory unit 215. STA 200 may optionally include other suitable hardware components and/or or software components. In some demonstrative embodiments, some or all of the components of STA 200 may be enclosed in a common housing or packaging, and may be interconnected or operably associated using one or more wired or wireless links. In other embodiments, components of STA 200 may be distributed among multiple or separate devices. It is noted that the exemplary architecture of STA 200 as shown in FIG. 2 and as described above may further be used as part of an architecture for any access points according to some demonstrative embodiments.

In some demonstrative embodiments, application processor 211 may include, for example, a central processing unit (CPU), a digital signal processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an integrated circuit (IC), an application-specific IC (ASIC), or any other suitable multi-purpose or specific processor or controller. Application processor 211 may execute instructions, for example, of an operating system (OS) of STA 200 and/or of one or more suitable applications.

In some demonstrative embodiments, input unit 218 may include, for example, one or more input pins on a circuit board, a keyboard, a keypad, a mouse, a touch-screen, a touch-pad, a track-ball, a stylus, a microphone, or other suitable pointing device or input device. Output unit 219 may include, for example, one or more output pins on a circuit board, a monitor, a screen, a touch-screen, a flat panel display, a light-emitting diode (LED) display unit, a liquid crystal display (LCD) display unit, a plasma display unit, one or more audio speakers or earphones, or other suitable output devices.

In some demonstrative embodiments, memory unit 215 may include, for example, a random-access memory (RAM), a read-only memory (ROM), a dynamic RAM (DRAM), a synchronous DRAM (SD-RAM), a flash memory, a volatile memory, a non-volatile memory, a cache memory, a buffer, a short-term memory unit, a long-term memory unit, or other suitable memory units. Storage unit 217 may include, for example, a hard disk drive, a floppy disk drive, a compact disk (CD) drive, a CD-ROM drive, a DVD drive, or other suitable removable or non-removable storage units. Memory unit 215 and/or storage unit 217, for example, may store data processed by STA 200.

As used below, "at least one of" a given set or list of items connected with "and" is mentioned herein, what is meant is a reference to either one of the noted items or any combination of the items. For example, as used herein, "at least one of A, B, and C" means A, or B, or C, or A and B, or A and C, or B and C, or A and B and C.

To enable WUR operation between a WUR transmitter, such as an AP on the one hand, and a WUR receiver, such as a WUR non-AP STA on the other hand, the AP and STA may engage in a WUR Mode setup frame exchange in order to set up and enable WUR operation between them. The WUR operation may involve, as noted above, the WUR of the WUR non-AP STA being in an on/active state to receive WUR packets from the AP, while its main radio system is off or in a low-power state. The negotiation may be by way of a WUR Action frame sent from the main radio system of the AP to the WUR non-AP STA.

Figure 3:
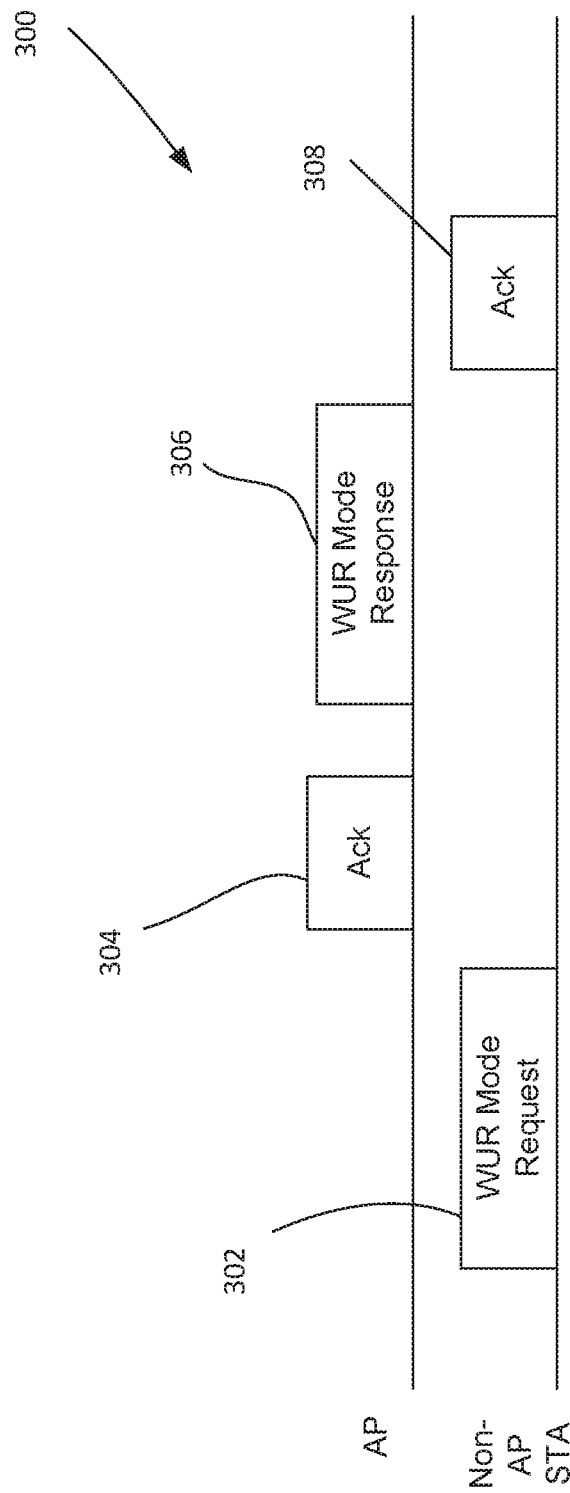
FIG. 3 illustrates a signaling diagram showing a two-way handshake negotiation to enter WUR Mode through a STA's Primary Connectivity Radio (PCR)

Referring now to FIG. 3, a signaling diagram 300 is shown depicting a WUR Mode setup frame exchange between an AP, such as AP 102, and a STA, such as STA 108 of FIG. 1. WUR operation allows communication between AP 102 and STA 108 to enter a WUR Mode. Let us assume for the purpose of the ensuing description that the main radio system 104 of AP 102 is a PCR 104, and that the main radio system PCR 110 of STA 108 is a PCR 110. The WUR Mode setup frame exchange may involve the use of the respective PCR components of the AP 102 and STA 108, and the frames thus exchanged may therefore include WiFi OFDM frames including for example non-High-Throughput (non-HT) Physical Layer Convergence Protocol Data Units (PPDUs). As seen in FIG. 3, the exchange may involve STA 108 sending a WUR Mode Request frame 302 from its PCR 110 to AP 102, where an Action type field in the Request frame 302 indicates a request for entry into the WUR Mode. The WUR Mode Request frame 302 may be followed by an Acknowledgement (ACK) 304 from the AP 102. The WUR Mode Request frame 302 may be followed by a WUR Mode Response 306 from the AP to the STA which may indicate a status signifying either an acceptance or denial to the STA for entry into WUR Mode. The WUR Mode Response 306 may be followed by an ACK 308 from the STA to the AP.

Entry into WUR Mode may entail each of the WUR AP 102 and WUR non-AP STA 108 storing WUR parameters for the negotiated WUR Mode into their respective memories in order to enable WUR operation based on the WUR Mode set up by way of a given WUR Mode setup frame exchange. For example, such parameters, including, for example, a Minimum Wake-up Duration field indicating the minimum "on" duration of a WUR duty cycle operation, a WUR Operating Class field indicating the operating class in use for transmission of a WUR frame from the WUR AP to the WUR non-AP STA, a WUR Channel field indicating the channel in use for transmission of a WUR frame from the WUR AP to the WUR non-AP STA, and a WUR Beacon period field representing the number of time units (TUs) between consecutive target WUR beacon transmission times (TWBTTs). Other parameters sent by the AP to the STA may include a WUR identifier (ID) identifying the WUR STA 108, a WUR Channel Offset, a starting time of the applicable WUR Duty Cycle, and one or more Group IDs assigned to the STA.

As noted above, some of the exemplary parameters previously mentioned enable an negotiated WUR Mode between the WUR AP 102 and WUR non-AP STA 108. A teardown of the negotiated WUR Mode may therefore involve a discarding/removal of WUR parameters from the AP and/or the STA's memory. The mechanism for discarding/removal of the WUR parameters may be implemented in any number of ways according to embodiments. For example, according to one embodiment, the MAC management processor 213 or another processor on the Wireless Circuit Card 202 distinct from the BB processors 208a and 208b, may generate a signal to cause a discarding of the parameters from one or more of memory 210a, 210b, 215 and 217. In the alternative, a processor not on the Wireless Circuit Card 202, such as the Application Processor 211, or another processor off the Wireless Circuit Card 202 and not part of the Application Processor 211, may send a signal to one or more of memory 210a, 210b, 215 and 217 to discard the WUR parameters. In addition, the WUR parameters may be stored in the BB memories 210a, 210b, 215 and/or 217 according to the specific implementation chosen. Thus, after teardown, the AP and/or STA would no longer maintain one or more of the previously negotiated WUR parameters. There is a need for a AP or non-AP STA to be able to exit or tear down an negotiated WUR Mode in a manner that makes efficient use of resources. Employing an extension of the WUR Mode setup frame exchange described above in relation to FIG. 3 could lead to the scenario shown in FIG. 4.

Figure 4:
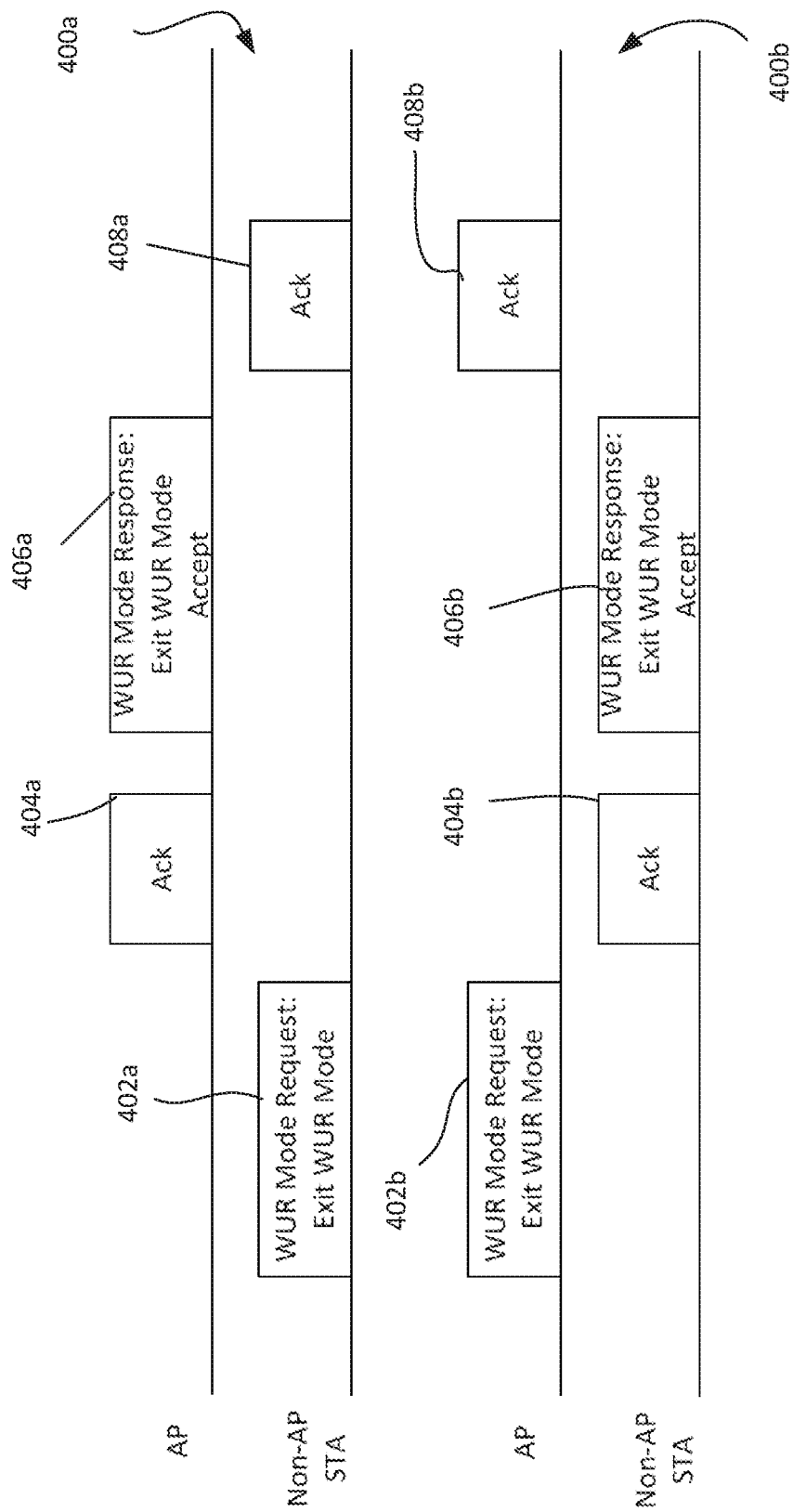
FIG. 4 illustrates a signaling diagram showing a two-way handshake to tear down a WUR Mode operation.

Referring now in particular to FIG. 4, respective signaling diagrams 400a and 400b are shown depicting two-way handshakes for a WUR Mode teardown when the non-AP STA requests the teardown (400a) and when the AP requests the teardown (400b). These two-way handshakes are reminiscent of the two-way handshake operation for setting up WUR Mode between AP 102 and STA 108. For diagrams 400a and 400b, a WUR Mode teardown frame exchange involves the use of the respective PCR components of the AP 102 and STA 108, and the frames thus exchanged may therefore include WiFi OFDM frames. As seen in diagram 400a, the exchange may involve STA 108 sending or transmitting a WUR Mode Teardown Request frame 402a from its PCR 110 to AP 102. The WUR Mode Teardown Request frame 402a may be followed by an Acknowledgement (ACK) 404a from the AP 102. The WUR Mode Teardown Request frame 402a may be followed by a WUR Mode Teardown Response 406a from the AP to the STA which may indicate a status signifying either an acceptance or denial to the STA for its request to tear down the WUR Mode. The WUR Mode Teardown Response 406a may be followed by an ACK 408a from the STA to the AP. As seen in diagram 400b, the exchange may involve AP 102 sending a WUR Mode Teardown Request frame 402b from its PCR 120 to STA 108. The WUR Mode Teardown Request frame 402b may be followed by an Acknowledgement (ACK) 404b from the STA 108. The WUR Mode Teardown Request frame 402b may be followed by a WUR Mode Response 406b from the STA to the AP which may indicate a status signifying either an acceptance or denial to the AP for tearing down the WUR Mode. The WUR Mode Response 406b may be followed by an ACK 408b from the AP to the STA.

However, disadvantageously, an extension of the mechanism of FIG. 3, the two-way handshake, to a WUR Mode teardown scenario unnecessarily wastes resources (e.g. time, air medium, physical resources, and power). Embodiments provide a signaling mechanism that does away with a two-way handshake for WUR Mode teardown, as they take into consideration the fact that there would be no reason for a WUR teardown request to be denied.

Embodiments address the above need by providing a WUR Mode teardown signaling regime that does not require a two-way handshake for the teardown to take place. According to some demonstrative embodiments, a WUR Mode Teardown Action frame is provided that can be sent by an AP or non-AP STA by its PCR to exit or teardown a negotiated WUR Mode. According to some demonstrative embodiments the WUR Mode Teardown Action frame is part of a one-way handshake signaling mechanisms that therefore does not involve a response frame from the recipient of the WUR Mode Teardown Action frame. Accordingly, embodiments do away with the unnecessary overhead of a two-way handshake (a request frame followed by a response frame) and with a permission from the recipient with respect to the teardown.

Figure 5:
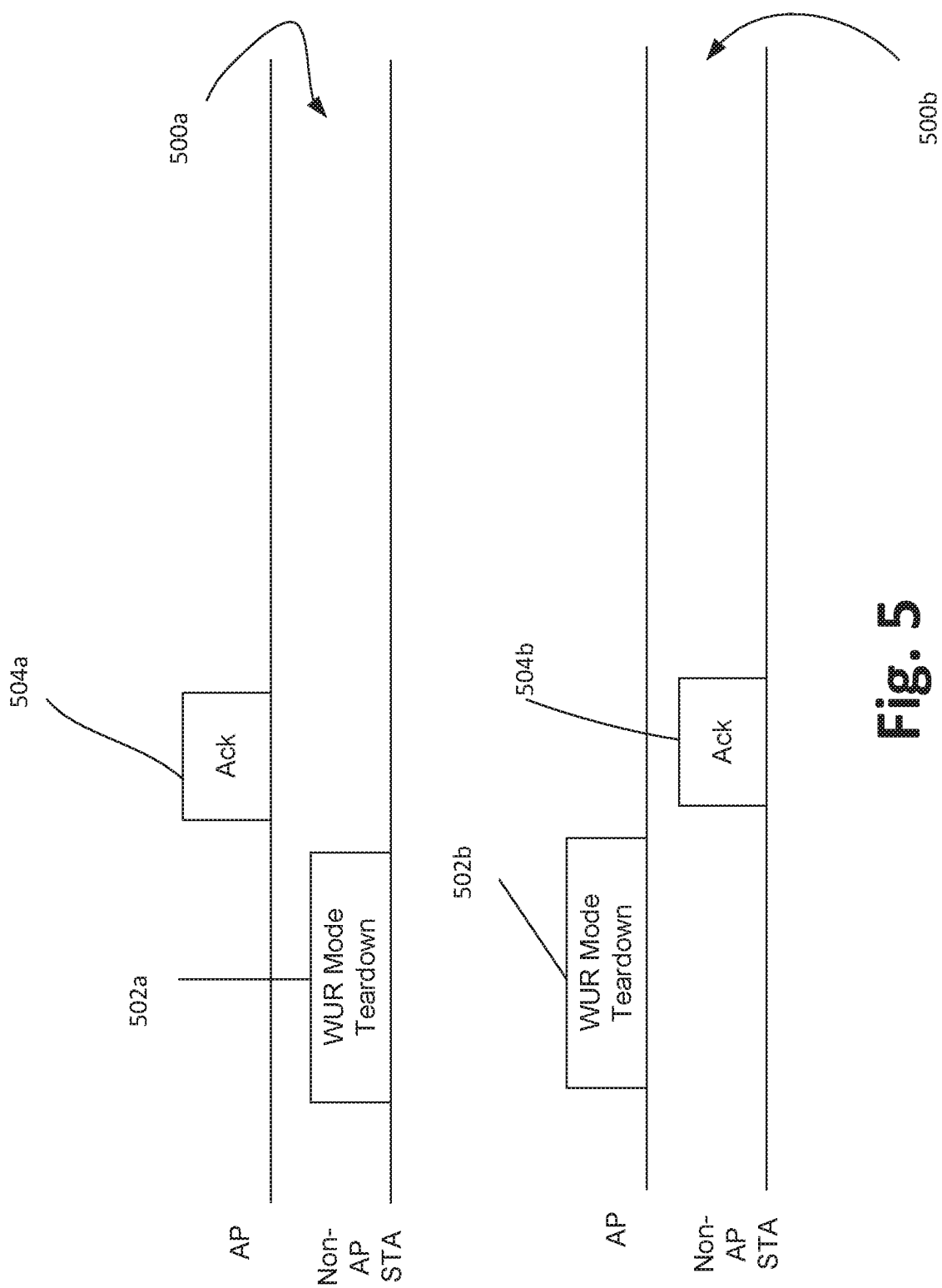
FIG. 5 a signaling diagram showing a one-way handshake to tear down a WUR Mode operation according to an embodiment.

Referring now in particular to FIG. 5, respective signaling diagrams 500a and 500b are shown depicting respective one-way handshakes for a WUR Mode teardown when the non-AP STA sends a notification regarding the teardown (500a) and when the AP sends a notification regarding the teardown (500b) according to embodiments. For diagrams 500a and 500b, a WUR Mode teardown procedure involves the use of the respective PCR components of the AP 102 and STA 108, and the frames thus sent may therefore include WiFi OFDM frames. As seen in diagram 500a, the procedure may involve STA 108 sending a WUR Mode teardown frame 502a from its PCR 110 to AP 102. The WUR Mode teardown frame 502a may be followed by an Acknowledgement (ACK) 504a from the AP 102, and without the WUR Mode teardown frame 502a being followed by any WUR Mode Response. No acceptances would be needed, and the teardown would become effective as a result. As seen in diagram 500b, the procedure may involve AP 102 sending a WUR Mode teardown frame 502b from its PCR 120 to STA 108. The WUR Mode teardown frame 502b may be followed by an Acknowledgement (ACK) 504b from the STA 108. The WUR Mode teardown frame 502b would not be followed by a WUR Mode Response. No acceptances would be needed, and the teardown would become effective as a result of the WUR Mode teardown frame.

Advantageously, the one-way handshake for WUR Mode teardown maximizes use of BSS resources (e.g. time, air medium, physical resources, and power) by providing a signaling mechanism for WUR Mode teardown that does not require a response to a WUR Mode Teardown frame. The teardown can therefore be enabled quickly and effectively. Enablement of the teardown would signify, among other things, that the WUR parameters established duration a WUR Mode negotiation procedure, as described for example in the context of FIG. 3 above, would be discarded from at least from the memory circuitry of the device (AP or STA) that initiated the teardown. In this way, the negotiation itself would have been "torn down."

Figure 6:
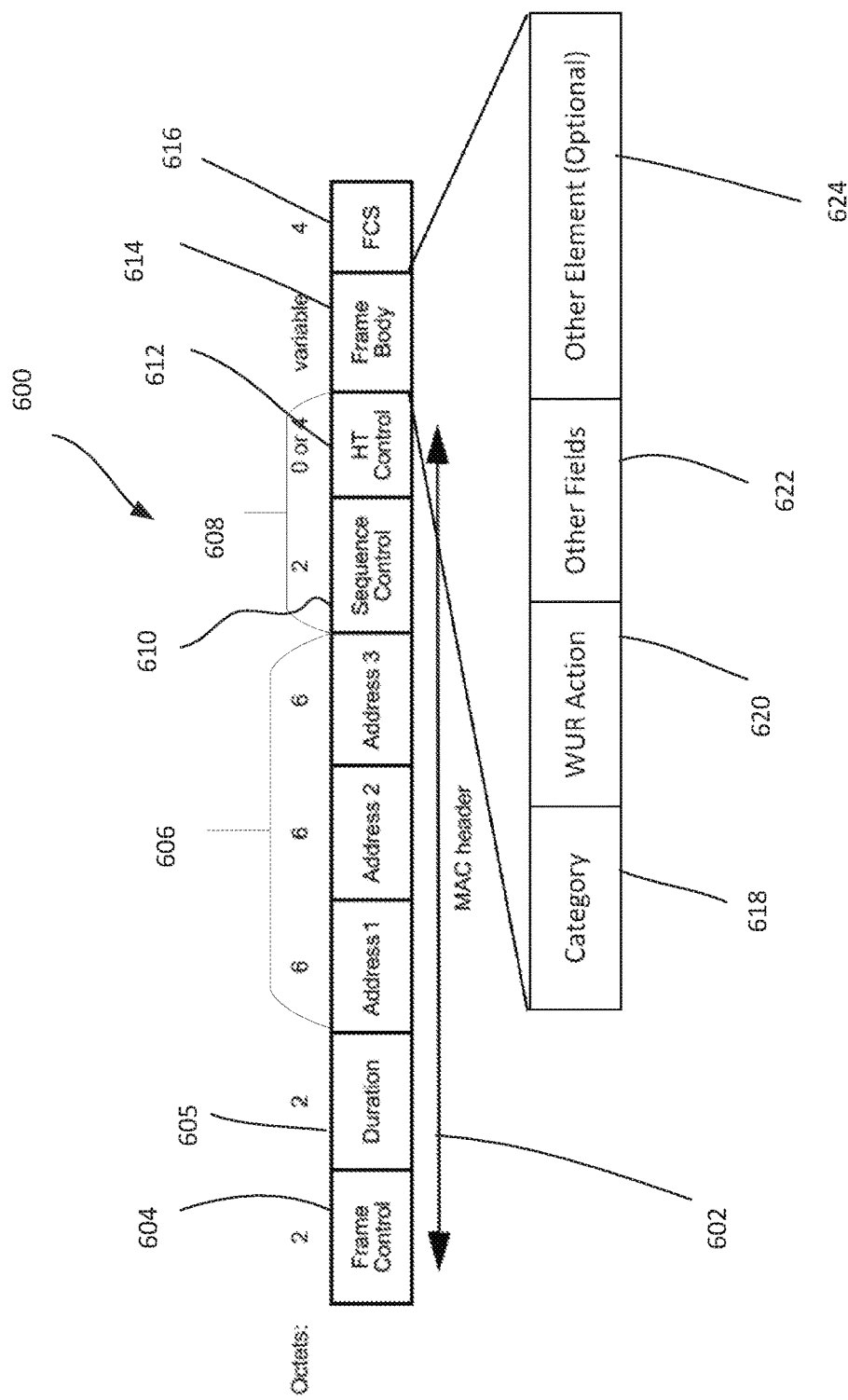
FIG. 6 illustrates an OFDM WUR frame format according to one embodiment.

Reference is now made to FIG. 6, which shows an example embodiment of a OFDM WUR frame format 600 according to one embodiment. As shown in FIG. 6, the WUR frame 600 includes the following components: a MAC header portion 602 which includes a Frame Control field 604, a Duration field 605, an Address portion 606, a Control portion 608 which may include one or more control fields, some of which may be optional, such as a Sequence Control field 610 and a High Throughput (HT) Control field 612. The WUR frame 600 may further include, after the MAC header portion 602, a Frame Body 614, and a Frame Check Sequence field 616. The Frame Control field 604, Address portion 606 and/or Control fields of Control portion 608 may, for example, each correspond to Frame Control, Address portion and Control fields as defined for a MAC frame format in IEEE 802.11-2016. The Frame Control field 604 may have a length of 2 octets or 8 bits; the Frame Body 614 may have a variable length, and the FCS 616 may have a length of 4 bits or 1 octet.

The WUR frame of FIG. 6 may include an Action frame. The Frame body 614 may in turn include a Category field 618, a WUR Action field 620, other fields 622, and optionally other elements 624. The Category field 618 may include a value to indicate a WUR Action frame. The WUR Action field 620 may include a value to indicate a WUR Mode teardown message. Other fields 622 may include, by way of example, information specific to the WUR frame type.

According to one embodiment, a WUR Mode may be automatically torn down by the AP under the following conditions: (1) the non-AP STA is disassociated from the AP; and/or (2) the AP has not received any transmission from the non-AP STA within a maximum idle period.

According to some demonstrative embodiments, a wireless communication device, such as, for example, a WUR baseband circuitry of a non-AP STA, may use its memory and its processing circuitry, including the control logic within processing circuitry, to cause the STA to: perform a WUR Mode setup frame exchange with a Primary Connectivity Radio (PCR) of an AP; establish WUR Mode operation with the AP based on the frame exchange; transmit a WUR Mode Teardown frame to the PCR of the AP, the WUR Mode Teardown frame including information to cause a teardown of the WUR Mode operation with the AP; and process an Acknowledgment message (ACK) from the AP to tear down the WUR Mode operation with the AP. Thus, the WUR Mode operation is torn down after the ACK and without a response message from the AP back to the STA with respect to the WUR Mode Teardown frame.

According to some demonstrative embodiments, a wireless communication device, such as, for example, a WUR baseband circuitry of an AP, may use its memory and its processing circuitry, including the control logic within processing circuitry, to cause the AP to: perform a WUR Mode setup frame exchange with a Primary Connectivity Radio (PCR) of a non-AP STA; establish WUR Mode operation with the non-AP STA based on the frame exchange; transmit a WUR Mode Teardown frame to the PCR of the non-AP STA, the WUR Mode Teardown frame including information to cause a teardown of the WUR Mode operation with the non-AP STA; and process an Acknowledgment message (ACK) from the non-AP STA to tear down the WUR Mode operation with the non-AP Sta. Thus, the WUR Mode operation is torn down after the ACK and without a response message from the non-AP STA back to the AP with respect to the WUR Mode Teardown frame.

Referring now to FIGS. 1-6 a wireless communication device, such as, for example, IC 212 of non-AP STA 200, may use its WLAN baseband processing circuitry including memory 209b and processor 210b and control logic within the processor 210b, to cause the non-AP STA 200 to: perform a WUR Mode setup frame exchange with a Primary Connectivity Radio (PCR) of an AP, (the PCR may, for example, correspond to BB 108a, Radio IC 206a and FEM 204a in FIG. 2 assuming that FIG. 2 shows the AP); establish WUR Mode operation with the AP based on the frame exchange; transmit a WUR Mode Teardown frame to the PCR of the AP, the WUR Mode Teardown frame including information to cause a teardown of the WUR Mode operation with the AP; and process an Acknowledgment message (ACK) from the AP to tear down the WUR Mode operation with the AP. Thus, the WUR Mode operation is torn down after the ACK and without a response message from the AP back to the STA with respect to the WUR Mode Teardown frame.

Referring to FIG. 2, the shown architecture may be deemed to represent an AP 200, according to some demonstrative embodiments. Here, IC 212 of AP123 200, may use its WLAN baseband processing circuitry including memory 209b and processor 210b and control logic within the processor 210b, to cause the AP 200 to: perform a WUR Mode setup frame exchange with a Primary Connectivity Radio (PCR) of an Non-AP STA, (the PCR may, for example, correspond to BB 108a, Radio IC 206a and FEM 204a in FIG. 2 assuming that FIG. 2 shows the Non-AP STA); establish WUR Mode operation with the Non-AP STA based on the frame exchange; transmit a WUR Mode Teardown frame to the PCR of the Non-AP STA, the WUR Mode Teardown frame including information to cause a teardown of the WUR Mode operation with the Non-AP STA; and process an Acknowledgment message (ACK) from the Non-AP STA to tear down the WUR Mode operation with the Non-AP STA. Thus, the WUR Mode operation is torn down after the ACK and without a response message from the Non-AP STA back to the AP with respect to the WUR Mode Teardown frame.

Figure 7:
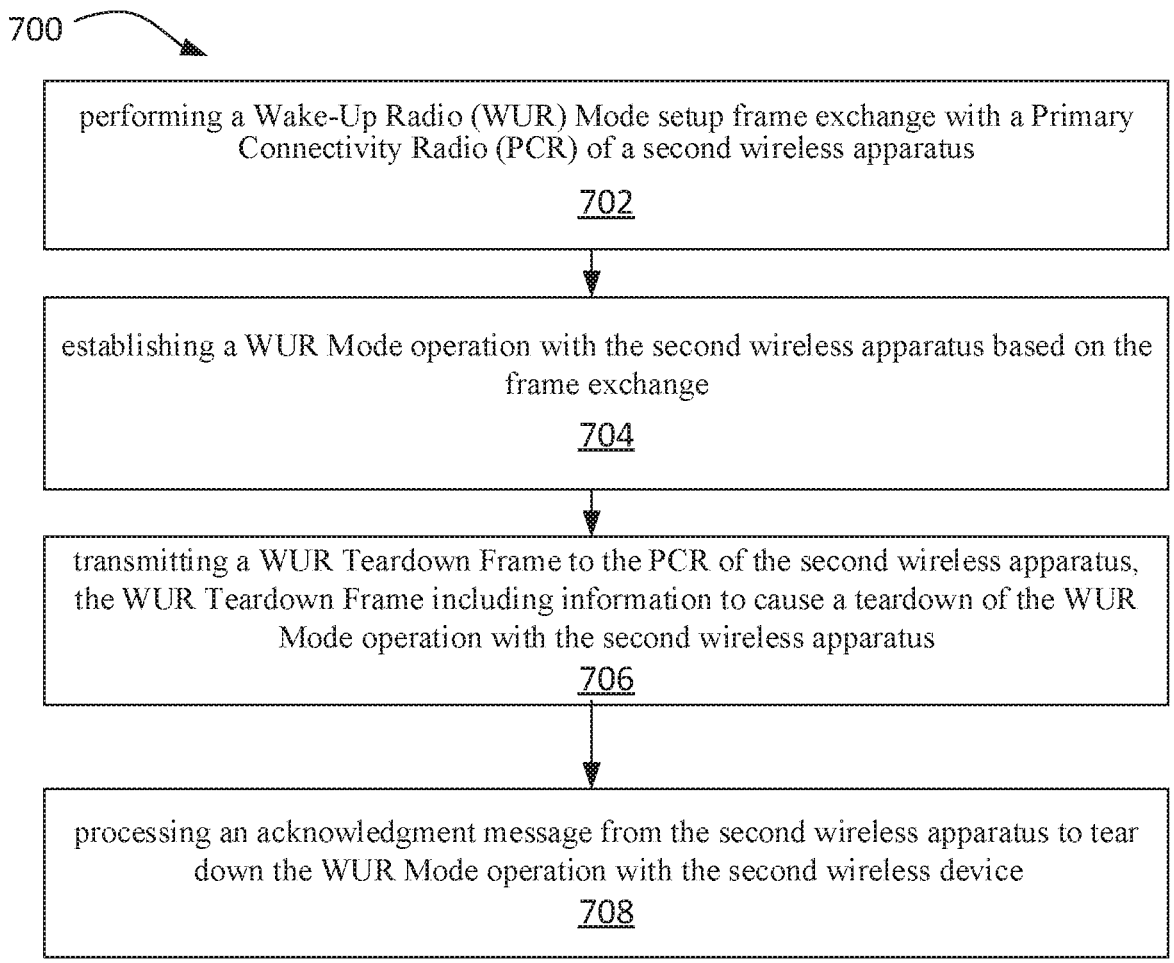
FIG. 7 is a schematic flow-chart illustration of a method in accordance with some demonstrative embodiments.

Reference is made to FIG. 7, which schematically illustrates a method in accordance with some demonstrative embodiments. For example, one or more of the operations of the method 700 of FIG. 7 may be performed by one or more elements of a non-AP STA or a AP, such as AP/STA 200 of FIG. 2. As indicated at block 702, the method may include performing a WUR Mode setup frame exchange with a Primary Connectivity Radio (PCR) of a second wireless apparatus. As indicated at block 704, the method may include establishing a Wake-Up Radio (WUR) Mode operation with the second wireless apparatus based on the frame exchange. As indicated at block 706, the method may include transmitting a Wake-Up Radio (WUR) Teardown Frame to the PCR of the second wireless apparatus, the WUR Mode Teardown frame including information to cause a teardown of the WUR Mode operation with the second wireless apparatus. As indicated at block 708, the method may include processing an acknowledgment message from the second wireless apparatus to tear down the WUR Mode operation with the second wireless apparatus.

Figure 8:
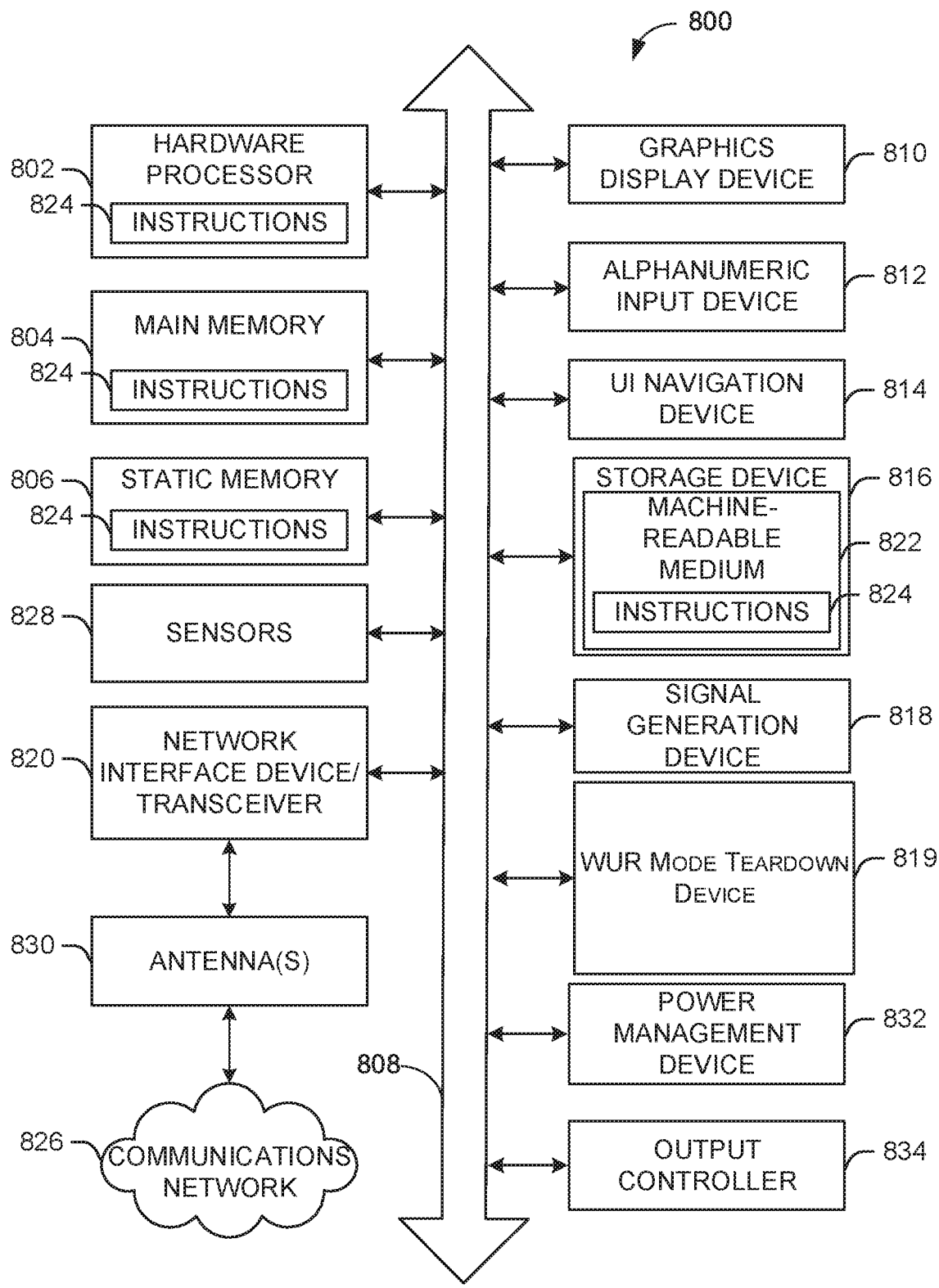
FIG. 8 illustrates a block diagram of an example machine upon which any of one or more techniques (e.g., methods) may be performed, in accordance with one or more example embodiments of the present disclosure.

FIG. 8 illustrates a block diagram of an example of a machine 800 or system upon which any one or more of the techniques (e.g., methodologies) discussed herein may be performed. In other embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environments. The machine 800 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a power management device 832, a graphics display device 810, an alphanumeric input device 812 (e.g., a keyboard), and a user interface (UI) navigation device 814 (e.g., a mouse). In an example, the graphics display device 810, alphanumeric input device 812, and UI navigation device 814 may be a touch screen display. The machine 800 may additionally include a storage device (i.e., drive unit) 816, a signal generation device 818 (e.g., a speaker), a WUR Mode teardown device 819, a network interface device/transceiver 820 coupled to antenna(s) 830, and one or more sensors 828, such as a global positioning system (GPS) sensor, a compass, an accelerometer, or other sensor. The machine 800 may include an output controller 834, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within the static memory 806, or within the hardware processor 802 during execution thereof by the machine 800. In an example, one or any combination of the hardware processor 802, the main memory 804, the static memory 806, or the storage device 816 may constitute machine-readable media.

The WUR Mode teardown device 819 may carry out or perform any of the operations and processes (e.g., process 700) described and shown above.

It is understood that the above are only a subset of what the WUR Mode teardown device 819 may be configured to perform and that other functions included throughout this disclosure may also be performed by the WUR Mode teardown device 819.

While the machine-readable medium 822 is illustrated as a single medium, the term "machine-readable medium" may include a single medium or multiple media (e.g., a centralized or distributed database, and/or associated caches and servers) configured to store the one or more instructions 824.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc. The computer-readable medium may further be intangible, and/or it may be transitory, according to some embodiments.

The term "machine-readable medium" may include any medium that is capable of storing, encoding, or carrying instructions for execution by the machine 800 and that cause the machine 800 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 824 may further be transmitted or received over a communications network 826 using a transmission medium via the network interface device/transceiver 820 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 820 may include one or more physical jacks (e.g., Ethernet, coaxial, or phone jacks) or one or more antennas to connect to the communications network 826. In an example, the network interface device/transceiver 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 800 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Examples

The following examples pertain to further embodiments.

Example 1 includes a device of a first wireless apparatus, the device comprising a memory, and processing circuitry coupled to the memory and including logic to cause the first wireless apparatus to: perform a WUR Mode setup frame exchange with a Primary Connectivity Radio (PCR) of a second wireless apparatus; establish a Wake-Up Radio (WUR) Mode operation with the second wireless apparatus based on the frame exchange; transmit a Wake-Up Radio (WUR) Teardown Frame to the PCR of the second wireless apparatus, the WUR Mode Teardown frame including information to cause a teardown of the WUR Mode operation with the second wireless apparatus; and process an acknowledgment message (ACK) from the second wireless apparatus to tear down the WUR Mode operation with the second wireless apparatus.

Example 2 includes the subject matter of Example 1, and optionally, wherein the WUR Mode Teardown frame includes a Category field and a WUR Action field following the Category field in a time domain, wherein the Category field indicates a WUR Action frame, and wherein the WUR Action field indicates a WUR teardown.

Example 3 includes the subject matter of Example 1, and optionally, wherein the WUR Mode Teardown frame includes: a Medium Access Control (MAC) header portion including a Frame Control field, an Address portion following the Frame Control field in a time domain, a Control portion including Control fields following the Address portion in the time domain; a Frame Body field following the MAC header portion in the time domain and including the information to cause the teardown; and a Frame Check Sequence (FCS) following the Frame Body field in the time domain.

Example 4 includes the subject matter of Example 3, and optionally, wherein the Frame Control field has a length of 2 octets, the FCS has a length of 4 octets, and the Frame Body has a variable length.

Example 5 includes the subject matter of Example 3, and optionally, wherein the Frame Body field includes a Category field and a WUR Action field following the Category field in a time domain, wherein the Category field indicates a WUR Action frame, and wherein the WUR Action field indicates a WUR teardown.

Example 6 includes the subject matter of Example 1, and optionally, wherein: the PCR is a second PCR; the first wireless apparatus is an access point (AP); the memory and processing circuitry are to be part of a first PCR of the AP; and the second wireless apparatus is a non-AP station (non-AP STA) and includes a Wake-Up Receiver (WURx) coupled to the second PCR to wake-up the second PCR based on Wake-Up (WU) packets from the AP during the WUR Mode operation.

Example 7 includes the subject matter of Example 1, and optionally, wherein: the PCR is a second PCR; the first wireless apparatus is a non-access point station (non-AP STA); the second wireless apparatus is an access point (AP); and the memory and processing circuitry are to be part of a first PCR of the non-AP STA, the non-AP STA further including a Wake-Up Receiver (WURx) coupled to the first PCR to wake-up the first PCR based on Wake-Up (WU) packets from the AP during the WUR Mode operation.

Example 8 includes the subject matter of Example 1, and optionally, wherein the memory is a first memory, the device to tear down the WUR Mode operation by discarding from a second memory WUR parameters negotiated during the WUR Mode setup frame exchange, wherein the first memory and the second memory include circuitries that are one of distinct from one another, or that at least partially overlap one another.

Example 9 includes the subject matter of Example 8, and optionally, wherein the first memory and the processing circuitry are part of a baseband processing circuitry, and wherein the second memory is distinct from the baseband processing circuitry.

Example 10 includes the subject matter of Example 8, and optionally, further including an application processor coupled to the processing circuitry, wherein at least one of the processing circuitry and the application processor is to generate a signal to cause the WUR parameters to be discarded from the second memory.

Example 11 includes the subject matter of Example 1, and optionally, where the memory and the processing circuitry are part of a Wi-Fi baseband processing circuitry, the device further including a Wake-Up Receiver (WURx) and a Medium Access Control (MAC) management processor coupled between the baseband processing circuitry and the WURx, the MAC management processor to generate a signal cause the baseband processing circuitry to switch from an inactive state to an awake based on signaling from the WURx.

Example 12 includes the subject matter of Example 1, and optionally, wherein the WUR Mode Teardown frame includes a non-High-Throughput (non-HT) Physical Layer Convergence Protocol Data Unit (PPDU).

Example 13 includes the subject matter of Example 1, and optionally, further including: a baseband processor including the memory and the processing circuitry; a radio integrated circuit (radio IC) coupled to the baseband processor; and radio front-end module circuitry coupled to the radio integrated circuit.

Example 14 includes the subject matter of Example 13, and optionally, further including one or more antennas coupled to the front-end module.

Example 15 includes a product comprising one or more tangible computer-readable non-transitory storage media comprising computer-executable instructions operable to, when executed by at least one computer processor of a first wireless apparatus, cause the at least one computer processor to implement operations at a device, the operations comprising: performing a Wake-Up Radio (WUR) Mode setup frame exchange with a Primary Connectivity Radio (PCR) of a second wireless apparatus; establishing a WUR Mode operation with the second wireless apparatus based on the frame exchange; transmitting a WUR Mode Teardown frame to the PCR of the second wireless apparatus, the WUR Mode Teardown frame including information to cause a teardown of the WUR Mode operation with the second wireless apparatus; and processing an acknowledgment message (ACK) from the second wireless apparatus to tear down the WUR Mode operation with the second wireless apparatus.

Example 16 includes the subject matter of Example 15, and optionally, wherein the WUR Mode Teardown frame includes a Category field and a WUR Action field following the Category field in a time domain, wherein the Category field indicates a WUR Action frame, and wherein the WUR Action field indicates a WUR teardown.

Example 17 includes the subject matter of Example 15, and optionally, wherein the WUR Mode Teardown frame includes: a Medium Access Control (MAC) header portion including a Frame Control field, an Address portion following the Frame Control field in a time domain, a Control portion including Control fields following the Address portion in the time domain; a Frame Body field following the MAC header portion in the time domain and including the information to cause the teardown; and a Frame Check Sequence (FCS) following the Frame Body field in the time domain.

Example 18 includes the subject matter of Example 17, and optionally, wherein the Frame Control field has a length of 2 octets, the FCS has a length of 4 octets, and the Frame Body has a variable length.

Example 19 includes the subject matter of Example 17, and optionally, wherein the Frame Body field includes a Category field and a WUR Action field following the Category field in a time domain, wherein the Category field indicates a WUR Action frame, and wherein the WUR Action field indicates a WUR teardown.

Example 20 includes the subject matter of Example 15, and optionally, wherein: the PCR is a second PCR; the first wireless apparatus is an access point (AP); the at least one computer processor is to be part of a first PCR of the AP; and the second wireless apparatus is a non-AP station (non-AP STA) and includes a Wake-Up Receiver (WURx) coupled to the second PCR to wake-up the second PCR based on Wake-Up (WU) packets from the AP during the WUR Mode operation.

Example 21 includes the subject matter of Example 15, and optionally, wherein: the PCR is a second PCR; the first wireless apparatus is a non-access point station (non-AP STA); the second wireless apparatus is an access point (AP); and the at least one computer processor is to be part of a first PCR of the non-AP STA, the non-AP STA further including a Wake-Up Receiver (WURx) coupled to the first PCR to wake-up the first PCR based on Wake-Up (WU) packets from the AP during the WUR Mode operation.

Example 22 includes the subject matter of Example 15, and optionally, the operations further including tearing down the WUR Mode operation by discarding from a memory WUR parameters negotiated during the WUR Mode setup frame exchange.

Example 23 includes the subject matter of Example 22, and optionally, wherein computer processor is part of a baseband processing circuitry, and wherein the memory is distinct from the baseband processing circuitry.

Example 24 includes the subject matter of Example 22, and optionally, wherein the operations further include generating a signal at at least one of an application processor and a baseband processing circuitry to cause the WUR parameters to be discarded from the memory.

Example 25 includes the subject matter of Example 15, and optionally, the operations including generating a signal at a Medium Access Control (MAC) management processor to cause the computer processor to switch from an inactive state to an awake based on signaling from a Wake-Up Receiver (WURx) coupled to the MAC management processor.

Example 26 includes the subject matter of Example 15, and optionally, wherein the WUR Mode Teardown frame includes a non-High-Throughput (non-HT) Physical Layer Convergence Protocol Data Unit (PPDU).

Example 27 includes a method to be performed at a device of a first wireless apparatus, the method including: performing a Wake-Up Radio (WUR) Mode setup frame exchange with a Primary Connectivity Radio (PCR) of a second wireless apparatus; establishing a WUR Mode operation with the second wireless apparatus based on the frame exchange; transmitting a WUR Mode Teardown frame to the PCR of the second wireless apparatus, the WUR Mode Teardown frame including information to cause a teardown of the WUR Mode operation with the second wireless apparatus; and processing an acknowledgment message (ACK) from the second wireless apparatus to tear down the WUR Mode operation with the second wireless apparatus.

Example 28 includes the subject matter of Example 27, and optionally, wherein the WUR Mode Teardown frame includes a Category field and a WUR Action field following the Category field in a time domain, wherein the Category field indicates a WUR Action frame, and wherein the WUR Action field indicates a WUR teardown.

Example 29 includes the subject matter of Example 27, and optionally, wherein the WUR Mode Teardown frame includes: a Medium Access Control (MAC) header portion including a Frame Control field, an Address portion following the Frame Control field in a time domain, a Control portion including Control fields following the Address portion in the time domain; a Frame Body field following the MAC header portion in the time domain and including the information to cause the teardown; and a Frame Check Sequence (FCS) following the Frame Body field in the time domain.

Example 30 includes the subject matter of Example 29, and optionally, wherein the Frame Control field has a length of 2 octets, the FCS has a length of 4 octets, and the Frame Body has a variable length.

Example 31 includes the subject matter of Example 29, and optionally, wherein the Frame Body field includes a Category field and a WUR Action field following the Category field in a time domain, wherein the Category field indicates a WUR Action frame, and wherein the WUR Action field indicates a WUR teardown.

Example 32 includes the subject matter of Example 27, and optionally, wherein: the PCR is a second PCR; the first wireless apparatus is an access point (AP); the method is to be performed by a first PCR of the AP; and the second wireless apparatus is a non-AP station (non-AP STA) and includes a Wake-Up Receiver (WURx) coupled to the second PCR to wake-up the second PCR based on Wake-Up (WU) packets from the AP during the WUR Mode operation.

Example 33 includes the subject matter of Example 27, and optionally, wherein: the PCR is a second PCR; the first wireless apparatus is a non-access point station (non-AP STA); the second wireless apparatus is an access point (AP); and the method is to be performed by a first PCR of the non-AP STA, the non-AP STA further including a Wake-Up Receiver (WURx) coupled to the first PCR to wake-up the first PCR based on Wake-Up (WU) packets from the AP during the WUR Mode operation.

Example 34 includes the subject matter of Example 27, and optionally, the operations further including tearing down the WUR Mode operation by discarding from a memory WUR parameters negotiated during the WUR Mode setup frame exchange.

Example 35 includes the subject matter of Example 34, and optionally, wherein the operations further include generating a signal at at least one of an application processor and a baseband processing circuitry to cause the WUR parameters to be discarded from the memory.

Example 36 includes the subject matter of Example 27, and optionally, further including generating a signal at a Medium Access Control (MAC) management processor to cause a switch of a Wi-Fi baseband processing circuitry from an inactive state to an awake based on signaling from a Wake-Up Receiver (WURx) coupled to the MAC management processor.

Example 37 includes the subject matter of Example 27, and optionally, wherein the WUR Mode Teardown frame includes a non-High-Throughput (non-HT) Physical Layer Convergence Protocol Data Unit (PPDU).

Example 38 includes a device of a first wireless apparatus, the device including: means performing a Wake-Up Radio (WUR) Mode setup frame exchange with a Primary Connectivity Radio (PCR) of a second wireless apparatus; means for establishing a WUR Mode operation with the second wireless apparatus based on the frame exchange; means for transmitting a WUR Mode Teardown frame to the PCR of the second wireless apparatus, the WUR Mode Teardown frame including information to cause a teardown of the WUR Mode operation with the second wireless apparatus; and means for processing an acknowledgment message (ACK) from the second wireless apparatus to tear down the WUR Mode operation with the second wireless apparatus.

Example 39 includes the subject matter of Example 38, and optionally, wherein the WUR Mode Teardown frame includes a Category field and a WUR Action field following the Category field in a time domain, wherein the Category field indicates a WUR Action frame, and wherein the WUR Action field indicates a WUR teardown.

Example 40 includes the subject matter of Example 38, and optionally, wherein the WUR Mode Teardown frame includes: a Medium Access Control (MAC) header portion including a Frame Control field, an Address portion following the Frame Control field in a time domain, a Control portion including Control fields following the Address portion in the time domain; a Frame Body field following the MAC header portion in the time domain and including the information to cause the teardown; and a Frame Check Sequence (FCS) following the Frame Body field in the time domain.

Example 41 includes the subject matter of Example 40, and optionally, wherein the Frame Control field has a length of 2 octets, the FCS has a length of 4 octets, and the Frame Body has a variable length.

Example 42 includes the subject matter of Example 40, and optionally, wherein the Frame Body field includes a Category field and a WUR Action field following the Category field in a time domain, wherein the Category field indicates a WUR Action frame, and wherein the WUR Action field indicates a WUR teardown.

Example 43 includes the subject matter of Example 38, and optionally, wherein: the PCR is a second PCR; the first wireless apparatus is an access point (AP); the device is to be part of a first PCR of the AP; and the second wireless apparatus is a non-AP station (non-AP STA) and includes a Wake-Up Receiver (WURx) coupled to the second PCR to wake-up the second PCR based on Wake-Up (WU) packets from the AP during the WUR Mode operation.

Example 44 includes the subject matter of Example 38, and optionally, wherein: the PCR is a second PCR; the first wireless apparatus is a non-access point station (non-AP STA); the second wireless apparatus is an access point (AP); and the device is to be part of a first PCR of the non-AP STA, the non-AP STA further including a Wake-Up Receiver (WURx) coupled to the first PCR to wake-up the first PCR based on Wake-Up (WU) packets from the AP during the WUR Mode operation.

Example 45 includes the subject matter of Example 38, and optionally, further including means for tearing down the WUR Mode operation by discarding from a memory WUR parameters negotiated during the WUR Mode setup frame exchange.

Example 46 includes the subject matter of Example 45, and optionally, wherein further including means for generating a signal at at least one of an application processor and a baseband processing circuitry to cause the WUR parameters to be discarded from the memory.

Example 47 includes the subject matter of Example 38, and optionally, further including means for generating a signal at a Medium Access Control (MAC) management processor to cause a switch of a Wi-Fi baseband processing circuitry from an inactive state to an awake based on signaling from a Wake-Up Receiver (WURx) coupled to the MAC management processor.

Example 48 includes the subject matter of Example 38, and optionally, wherein the WUR Mode Teardown frame includes a non-High-Throughput (non-HT) Physical Layer Convergence Protocol Data Unit (PPDU).

Example 49 includes an apparatus comprising means to perform a method as claimed in any preceding claim.

Example 50 includes a machine-readable storage including machine-readable instructions, when executed, are to implement a method or realize a device as claimed in any preceding claim.

Example 51 includes a machine readable medium including code, when executed, are to cause a machine to perform the method of any one of claims 27-37.

What is claimed is:

1. A device of a first wireless apparatus, the device comprising a memory, and processing circuitry coupled to the memory and including logic to cause the first wireless apparatus to:
perform a Wake-Up Radio (WUR) Mode setup frame exchange with a Primary Connectivity Radio (PCR) of a second wireless apparatus;
establish a WUR Mode operation with the second wireless apparatus based on the frame exchange;
transmit a WUR Mode Teardown frame to the PCR of the second wireless apparatus, the WUR Mode Teardown frame including information to cause a teardown of the WUR Mode operation with the second wireless apparatus; and
process an acknowledgment message (ACK) from the second wireless apparatus to tear down the WUR Mode operation with the second wireless apparatus;
wherein:
the memory is a first memory, the device to tear down the WUR Mode operation by discarding from a second memory WUR parameters negotiated during the WUR Mode setup frame exchange;
the first memory and the second memory include circuitries that are one of distinct from one another, or that at least partially overlap one another; and
the WUR parameters include a Minimum Wake-up Duration corresponding to a minimum on duration of a WUR duty cycle operation, a WUR Operating Class corresponding to an operating class in use for transmission of a WUR frame, a WUR Channel corresponding to a channel for transmission of the WUR frame, a WUR Beacon period corresponding to a number of time units (TUs) between consecutive target WUR beacon transmission times (TWBTTs).

2. The device of claim 1, wherein the WUR Mode Teardown frame includes a Category field and a WUR Action field following the Category field in a time domain, wherein the Category field indicates a WUR Action frame, and wherein the WUR Action field indicates a WUR teardown.

3. The device of claim 1, wherein the WUR Mode Teardown frame includes:
a Medium Access Control (MAC) header portion including a Frame Control field, an Address portion following the Frame Control field in a time domain, a Control portion including Control fields following the Address portion in the time domain;
a Frame Body field following the MAC header portion in the time domain and including the information to cause the teardown; and
a Frame Check Sequence (FCS) following the Frame Body field in the time domain.

4. The device of claim 3, wherein the Frame Control field has a length of 2 octets, the FCS has a length of 4 octets, and the Frame Body has a variable length.

5. The device of claim 3, wherein the Frame Body field includes a Category field and a WUR Action field following the Category field in a time domain, wherein the Category field indicates a WUR Action frame, and wherein the WUR Action field indicates a WUR teardown.

6. The device of claim 1, wherein:
the PCR is a second PCR;
the first wireless apparatus is an access point (AP);
the memory and processing circuitry are to be part of a first PCR of the AP; and
the second wireless apparatus is a non-AP station (non-AP STA) and includes a Wake-Up Receiver (WURx) coupled to the second PCR to wake-up the second PCR based on Wake-Up (WU) packets from the AP during the WUR Mode operation.

7. The device of claim 1, wherein:
the PCR is a second PCR;
the first wireless apparatus is a non-access point station (non-AP STA);
the second wireless apparatus is an access point (AP); and
the memory and processing circuitry are to be part of a first PCR of the non-AP STA, the non-AP STA further including a Wake-Up Receiver (WURx) coupled to the first PCR to wake-up the first PCR based on Wake-Up (WU) packets from the AP during the WUR Mode operation.

8. The device of claim 1, wherein the first memory and the processing circuitry are part of a baseband processing circuitry, and wherein the second memory is distinct from the baseband processing circuitry.

9. The device of claim 1, further including an application processor coupled to the processing circuitry, wherein at least one of the processing circuitry and the application processor is to generate a signal to cause the WUR parameters to be discarded from the second memory.

10. The device of claim 1, where the memory and the processing circuitry are part of a Wi-Fi baseband processing circuitry, the device further including a Wake-Up Receiver (WURx) and a Medium Access Control (MAC) management processor coupled between the baseband processing circuitry and the WURx, the MAC management processor to generate a signal cause the baseband processing circuitry to switch from an inactive state to an awake state based on signaling from the WURx.

11. The device of claim 1, wherein the WUR Mode Teardown frame includes a non-High-Throughput (non-HT) Physical Layer Convergence Protocol Data Unit (PPDU).

12. The device of claim 1, further including:
a baseband processor including the memory and the processing circuitry;
a radio integrated circuit (radio IC) coupled to the baseband processor; and
radio front-end module circuitry coupled to the radio integrated circuit.

13. The device of claim 12, further including one or more antennas coupled to the front-end module.

14. A product comprising one or more tangible computer-readable non-transitory storage media comprising computer-executable instructions operable to, when executed by at least one computer processor of a first wireless apparatus, cause the at least one computer processor to implement operations at a device, the operations comprising:
performing a Wake-Up Radio (WUR) Mode setup frame exchange with a Primary Connectivity Radio (PCR) of a second wireless apparatus;
establishing a WUR Mode operation with the second wireless apparatus based on the frame exchange;
transmitting a WUR Mode Teardown frame to the PCR of the second wireless apparatus, the WUR Mode Teardown frame including information to cause a teardown of the WUR Mode operation with the second wireless apparatus; and processing an acknowledgment message (ACK) from the second wireless apparatus to tear down the WUR Mode operation with the second wireless apparatus;

wherein:
causing the tear down of the WUR Mode operation includes discarding WUR parameters negotiated during the WUR Mode setup frame exchange; and
the WUR parameters include a Minimum Wake-up Duration corresponding to a minimum on duration of a WUR duty cycle operation, a WUR Operating Class corresponding to an operating class in use for transmission of a WUR frame, a WUR Channel corresponding to a channel for transmission of the WUR frame, a WUR Beacon period corresponding to a number of time units (TUs) between consecutive target WUR beacon transmission times (TWBTTs).

15. The product of claim 14, wherein the WUR Mode Teardown frame includes a Category field and a WUR Action field following the Category field in a time domain, wherein the Category field indicates a WUR Action frame, and wherein the WUR Action field indicates a WUR teardown.

16. The product of claim 14, wherein the WUR Mode Teardown frame includes:
a Medium Access Control (MAC) header portion including a Frame Control field, an Address portion following the Frame Control field in a time domain, a Control portion including Control fields following the Address portion in the time domain;
a Frame Body field following the MAC header portion in the time domain and including the information to cause the teardown; and
a Frame Check Sequence (FCS) following the Frame Body field in the time domain.

17. The product of claim 16, wherein the Frame Body field includes a Category field and a WUR Action field following the Category field in a time domain, wherein the Category field indicates a WUR Action frame, and wherein the WUR Action field indicates a WUR teardown.

18. The product of claim 15, the operations including generating a signal at a Medium Access Control (MAC) management processor to cause the computer processor to switch from an inactive state to an awake state based on signaling from a Wake-Up Receiver (WURx) coupled to the MAC management processor.

19. A method to be performed at a device of a first wireless apparatus, the method including:
performing a Wake-Up Radio (WUR) Mode setup frame exchange with a Primary Connectivity Radio (PCR) of a second wireless apparatus;
establishing a WUR Mode operation with the second wireless apparatus based on the frame exchange;
transmitting a WUR Mode Teardown frame to the PCR of the second wireless apparatus, the WUR Mode Teardown frame including information to cause a teardown of the WUR Mode operation with the second wireless apparatus; and
processing an acknowledgment message (ACK) from the second wireless apparatus to tear down the WUR Mode operation with the second wireless apparatus; and
wherein:
causing the tear down of the WUR Mode operation includes discarding WUR parameters negotiated during the WUR Mode setup frame exchange; and
the WUR parameters include a Minimum Wake-up Duration corresponding to a minimum on duration of a WUR duty cycle operation, a WUR Operating Class corresponding to an operating class in use for transmission of a WUR frame, a WUR Channel corresponding to a channel for transmission of the WUR frame, a WUR Beacon period corresponding to a number of time units (TUs) between consecutive target WUR beacon transmission times (TWBTTs).

20. The method of claim 19, wherein the WUR Mode Teardown frame includes a Category field and a WUR Action field following the Category field in a time domain, wherein the Category field indicates a WUR Action frame, and wherein the WUR Action field indicates a WUR teardown.

21. The method of claim 19, wherein the WUR Mode Teardown frame includes:
a Medium Access Control (MAC) header portion including a Frame Control field, an Address portion following the Frame Control field in a time domain, a Control portion including Control fields following the Address portion in the time domain;
a Frame Body field following the MAC header portion in the time domain and including the information to cause the teardown, the Frame Body field including a Category field and a WUR Action field following the Category field in a time domain, wherein the Category field indicates a WUR Action frame, and wherein the WUR Action field indicates a WUR teardown; and
a Frame Check Sequence (FCS) following the Frame Body field in the time domain.

22. A device of a first wireless apparatus, the device including:
means performing a Wake-Up Radio (WUR) Mode setup frame exchange with a Primary Connectivity Radio (PCR) of a second wireless apparatus;
means for establishing a WUR Mode operation with the second wireless apparatus based on the frame exchange;
means for transmitting a WUR Mode Teardown frame to the PCR of the second wireless apparatus, the WUR Mode Teardown frame including information to cause a teardown of the WUR Mode operation with the second wireless apparatus;
means for processing an acknowledgment message (ACK) from the second wireless apparatus to tear down the WUR Mode operation with the second wireless apparatus; and
means for discarding WUR parameters negotiated during the WUR Mode setup frame exchange, the WUR parameters including a Minimum Wake-up Duration corresponding to a minimum on duration of a WUR duty cycle operation, a WUR Operating Class corresponding to an operating class in use for transmission of a WUR frame, a WUR Channel corresponding to a channel for transmission of the WUR frame, a WUR Beacon period corresponding to a number of time units (TUs) between consecutive target WUR beacon transmission times (TWBTTs).

23. The device of claim 22, wherein the WUR Mode Teardown frame includes a Category field and a WUR Action field following the Category field in a time domain, wherein the Category field indicates a WUR Action frame, and wherein the WUR Action field indicates a WUR teardown.

* * * * *